United States Patent

[11] 3,609,446

[72] Inventors Neal Wesley Hursh;
John Joseph McArdle, both of Indianapolis, Ind.
[21] Appl. No. 829,499
[22] Filed June 2, 1969
[45] Patented Sept. 28, 1971
[73] Assignee RCA Corporation

[54] POWER SUPPLY UTILIZING A DIODE AND CAPACITOR VOLTAGE MULTIPLIER FOR TRACKING FOCUSING AND ULTOR VOLTAGES

8 Claims, 1 Drawing Fig.

[52] U.S. Cl. .......... 315/31, 315/27
[51] Int. Cl. .......... H01j 29/56
[50] Field of Search .......... 315/31, 205; 307/109, 110

[56] References Cited
UNITED STATES PATENTS
3,048,766 8/1962 Panzer .......... 321/15
3,495,126 2/1970 Dietz .......... 315/31

*Primary Examiner*—Rodney D. Bennett, Jr.
*Assistant Examiner*—J. M. Potenza
*Attorney*—Eugene M. Whitacre

ABSTRACT: A television receiver high voltage power supply includes an ultor voltage output and an output voltage at some potential lower than the ultor voltage. The supply is responsive to kinescope beam current to vary the proportionate magnitudes of the high and lower voltages at some predetermined ratio.

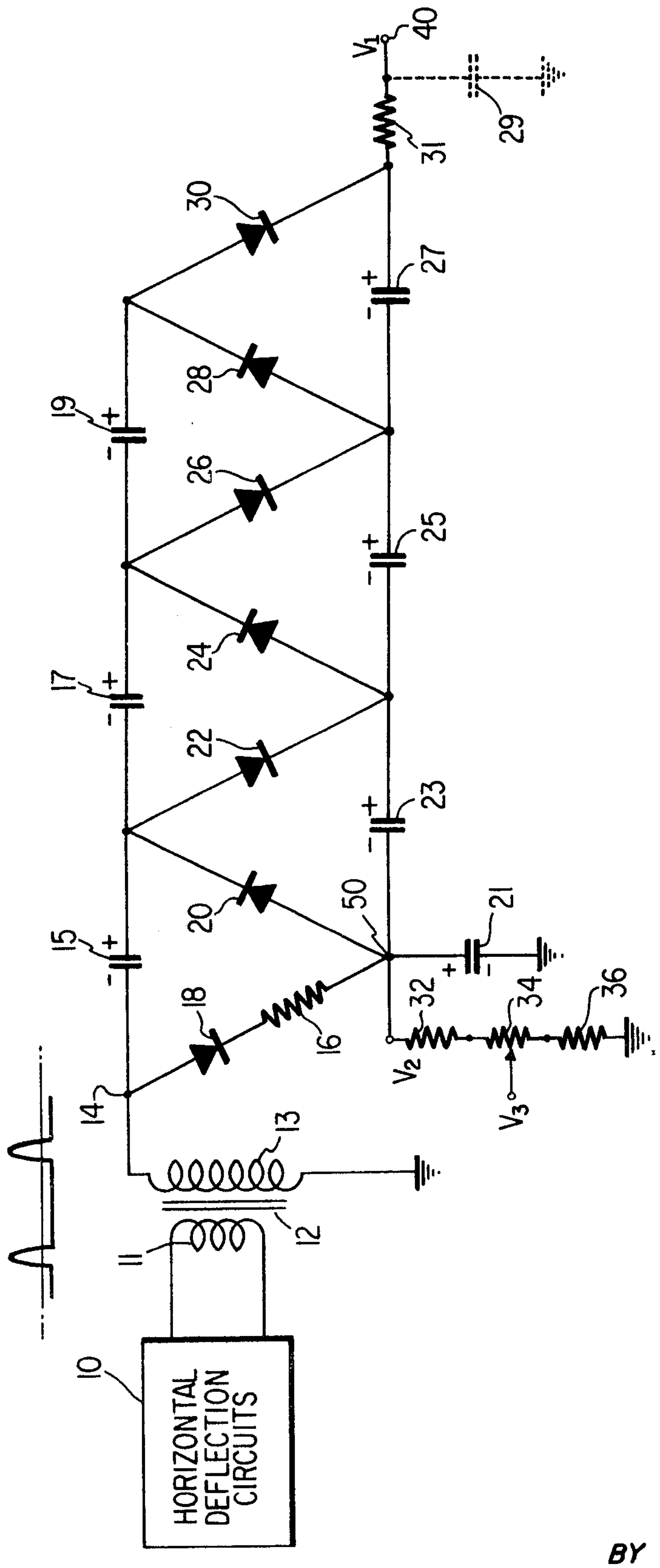
INVENTORS
Neal Wesley Hursh and
John Joseph Mc Ardle
BY Eugene M. Whitacre
ATTORNEY

POWER SUPPLY UTILIZING A DIODE AND CAPACITOR VOLTAGE MULTIPLIER FOR TRACKING FOCUSING AND ULTOR VOLTAGES

POWER SUPPLY

This invention relates to high direct voltage power supplies and more particularly to television receiver high voltage and focus voltage supplies employing voltage multiplier arrangements.

In a television receiver, electron beam focusing in the kinescope is commonly achieved by utilizing an electrostatic focusing lens. For optimum focusing, it is necessary to vary the strength of the focusing lens with varying beam current and electron velocity (i.e., electron beam accelerating voltage). The focusing lens may comprise, for example, a pair of cylindrically shaped members mounted along the kinescope gun axis and having a separating space between them. Focusing is accomplished by the electric field produced by the geometry of the focusing members and the potential difference between them —that is, by the shape and magnitude of the focusing field. In order to maintain a beam or beams of electrons in optimum focus under varying beam current conditions and differing electron beam velocities, it is necessary to vary the focusing field. Since the geometry of the focusing members is fixed, it is necessary to adjust the voltage difference between these members to effect proper focusing.

As beam current increases, if the high voltage (the accelerating potential of the electron beam) remains substantially constant, as is the case with a regulated high voltage supply, a stronger focusing lens is needed to maintain focusing of the electron beam. The strength of the focusing lens can be increased, where, as in a color television receiver, the focusing members are coupled to a focus voltage supply and the high beam-accelerating voltage supply, respectively, by decreasing the output of the focus voltage supply to increase the potential gradient across the focusing lens. Thus, if the high voltage is constant and the beam current increases, the focus voltage as a percentage of the high voltage should be decreased to maintain focus at high beam current levels. Further, if the high voltage (electron-accelerating potential) is not maintained constant but decreases somewhat, and therefore the electron velocity decreases as beam current increases, the strength of the focusing lens should be increased which again requires a reduction in focus voltage. The percentage reduction in focus voltage customarily is equal to or greater than the corresponding percentage reduction in high voltage. This effect is commonly referred to as "focus tracking."

In television receivers, it is common to develop the high voltage from a secondary winding on the horizontal deflection output transformer. The flyback pulses developed during horizontal retrace are stepped up by the flyback transformer and rectified to produce the necessary high voltage. Further, it is common to provide separate rectifying means coupled to a lower voltage tap on the flyback transformer, to develop a focus voltage in a color television receiver.

U.S. Pat. No. 2,879,447 (issued to J. O. Preisig) assigned to the present assignee discloses such an arrangement including means for obtaining the necessary "focus tracking" described above.

The present invention obviates the need for separate transformer windings for the high voltage and focus voltage supplies but provides the desired focus tracking while deriving both high voltage (beam-accelerating voltage) and focus voltage from a common point on the horizontal output transformer by means of a voltage multiplier arrangement.

Circuits embodying the present invention include a horizontal output transformer having a high voltage winding, voltage-multiplying means coupled to the high voltage winding for producing the ultor voltage for a television receiver, and lower voltage output means associated with the voltage multiplying means and responsive to beam current for producing a voltage which tracks with the ultor voltage.

A better understanding of the present invention and its features and advantages can be obtained by reference to the single FIGURE and the description below.

In the drawing, a voltage supply constructed in accordance with the present invention is illustrated partially in block and partially in schematic form.

Referring to the FIGURE, horizontal deflection circuits 10 include a horizontal output stage (not shown) which produces a generally sawtooth current waveform characterized by a relatively slow rise time during a trace portion of each deflection cycle and a relatively rapid fall time during a retrace portion of each deflection cycle. For clarity, the deflection windings and associated horizontal output circuitry are not shown. Such a circuit is shown in detail in RCA Television Service Data 1968 No. 20, published by RCA Sales Corporation, Indianapolis, Indiana. It is sufficient for the purposes of the present invention to note that during the retrace portion of each deflection cycle, energy in the form of a voltage pulse commonly referred to as a flyback pulse is coupled by means of a primary winding 11 of a horizontal output transformer 12 to a secondary winding 13 thereof. The turns ratio of transformer 12 is selected to step up the voltage of this flyback pulse appearing at a high voltage terminal 14 on secondary winding 13. The voltage magnitude of this flyback pulse is partially dependent upon the turns ratio of transformer 12 and in the circuit illustrated is of the order of 6.25 kilovolts. This will produce an ultor voltage ($V_1$) of approximately 25 kilovolts at ultor output terminal 40 when applied to the voltage quadrupler described below.

The voltage multiplier may be designed to multiply by any number $n$ by adding or subtracting successive stages of multiplication. Thus, the necessary stepped up flyback voltage magnitude will be approximately $V_1/n$ where $V_1$ is the desired ultor voltage at terminal 40 and $n$ is the number of stages of multiplication.

When the system is initially put into operation, positive flyback pulses will cause a first undirectional conductive device such as a diode 18 to be forward biased and conduct to charge a focus output charge storage device such as a capacitor 21 in the polarity shown and at a potential nearly equal to the peak flyback voltage appearing at high voltage terminal 14. As the flyback pulse decreases from its peak value, a second unidirectional conductive device 20 will then be forward biased, since its anode connected to terminal 50 will be more positive than its cathode, the latter being at the same voltage as terminal 14 at this time. When device 20 conducts, at least a portion of the charge on the output or focus charge storage device 21 is transferred to a first charge storage device 15 in the polarity shown. The transfer of charge continues during successive deflection cycles by the conduction of a third unidirectional conductive device 22 to charge a second charge storage device 23, the conduction of a fourth unidirectional conductive device 24 to charge a third charge storage device 17, the conduction of a fifth unidirectional conductive device 26 to charge a fourth charge storage device 25, the conduction of a sixth unidirectional conductive device 28 to charge a fifth charge storage device 19, and the conduction of a seventh unidirectional conductive device 30 to charge a final charge storage device 27. Assuming there are no losses within the system and no current is being drawn from the system as successive flyback pulses occur, the charge storage devices mentioned, with the exception of devices 15 and 21 as will be explained below, will each become charged to approximately the peak to peak value of the transformed flyback pulse waveform illustrated on the drawing. The charge storage device 21 charges only during the positive flyback pulse portion of the waveform and, as a consequence of a resistor 16 coupled in series with conductive device 18, charges to a voltage less than the peak amplitude of the flyback pulse. Therefore, when conductive device 20 conducts, storage device 15 charges to a voltage equal to the voltage across storage device 21 plus the negative voltage at terminal 14 occurring between flyback pulses (i.e., less than the peak-to-peak value of the waveform at terminal 14 by, for example, 200 volts). Adding the series voltages across charge storage devices 21, 23, 25 and 27, the output voltage at terminal 40 will be approximately three times the peak to peak flyback voltage plus the voltage across storage device 21 or almost four times the peak-to-peak flyback voltage. Kinescope charge storage device 29, illustrated in dotted lines, is the capacitance of the aquadag coating on the associated kinescope to ground. A resistance 31 is serially coupled from the final charge storage device 27 to an output terminal 40 and serves as a current-limiting resistance to protect the horizontal output circuit in the event of kinescope arcing.

As current is drawn from the system due to a flow of beam current within the kinescope, charge storage devices 21, 23, 25, 27 and 29 begin to discharge to supply the output current. As this occurs, the voltage across these devices will decrease. The unidirectional conductive devices 22, 26 and 30 conduct to equalize the voltage across storage devices in the upper series connection (in the drawing) with those across devices in the lower series connection. The flyback pulse will be coupled via charge storage devices 15, 17 and 19 and unidirectional conductive devices 18, 20, 26 and 30 will conduct when forward biased to restore the charge on the charge storage devices. Unidirectional devices 20, 24 and 28 then conduct to again equalize voltages. A mean direct current will flow through the charge transfer unidirectional conductive devices and resistance 16 serially coupled to the first unidirectional conductive device 18. As beam current increases, this mean current increases, thus developing a large voltage drop across resistance 16. Since the voltage at terminal 50 is approximately one-quarter that of the ultor voltage $V_1$at terminal 40, and since resistance 16 is relatively large as compared with the forward resistance of the unidirectional conductive devices, the percentage decrease of the voltage $V_2$ present at terminal 50 will be greater than the percentage decrease of the ultor voltage present at terminal 40 for high beam current. The utilization of resistance 16 in series relation to unidirectional conductive device 18 provides the proper relationship between the focus voltage and ultor voltage. It is noted that although resistance 16 is illustrated as a separate element, it may be incorporated within a unidirectional conductive device as for example, one having a higher forward resistance than the remaining devices 20, 22, 24, 26, 28 and 30.

A voltage dividing network comprising resistors 32, 34 and 36 serially coupled from terminal 50 to ground provide a network from which an adjustable voltage $V_3$ can be extracted by means of a variable resistor 34.

Although the present invention is particularly suitable for focus tracking applications, it may be useful wherever a voltage which is responsive to beam current is desired.

The parameters listed below have been utilized in the preferred embodiment.

| | | |
|---|---|---|
| Capacitors 15, 17, 19 | | |
| | 21, 23, 25, 27 | 2,000 picofarads |
| Capacitor 29 | | 2,500 picofarads |
| Resistors 16 | | 22 kiloohms |
| | 31 | 10 kiloohms |
| Resistors | 32 | 5 megohms |
| | 34 | 15 megohms |
| | 36 | 30 megohms |
| Diodes 18, 20, 22 | | 9 kilovolt peak inverse voltage,5 milliamp |
| | 24,26,28,30 | 5 ampere surge |

What is claimed is:

1. In a television receiver electron beam deflection system, a power supply comprising:
   a horizontal deflection transformer having a high voltage deflection winding,
   voltage-multiplying means coupled to said high voltage winding comprising a plurality of series-connected circuit branches, each branch having at least one unidirectionally conductive device, and a plurality of charge storage devices, each said charge storage device being coupled across the series combination of at least two of said unidirectionally conductive devices for producing a direct electron beam accelerating voltage; and
   lower voltage output means coupled to at least a first one of said circuit branches, said first circuit branch having a higher series impedance than others of said series-connected branches, said output means being responsive, in conjunction with said associated first circuit branch, to the magnitude of electron beam current for producing a voltage which tracks said beam accelerating voltage.

2. A circuit as defined in claim 1 wherein said voltage multiplying means comprise at least:
   first, second, third, and fourth, unidirectional conductive devices serially coupled from a high voltage terminal on said horizontal output transformer to an output terminal, said unidirectional conductive devices being poled to conduct in the same direction;
   a first charge storage device coupled from said high voltage terminal to a junction of said second and third unidirectional conductive devices, and a third charge storage device coupled from said junction of said second and third unidirectional conductive devices to a junction of said fourth and fifth unidirectional conductive devices, said first and third charge storage devices being coupled in series relation;
   a resistance coupled in series relation between said high voltage terminal and said second unidirectionally conductive device; and
   a second charge storage device coupled from a junction of said second unidirectional conductive device and the series combination of said first unidirectional conductive device and resistance to a junction of said third and fourth unidirectional conductive devices, a fourth charge storage device coupled from said junction of said third and fourth unidirectional conductive devices to said fifth unidirectional conductive device remote from said third storage device, and a final charge storage device coupled from said junction of said fifth unidirectional conductive device and said fourth storage device to said output terminal.

3. A circuit as defined in claim 1 wherein
   said lower voltage output means comprises an output charge storage device having one terminal returned to a reference potential; and
   said first circuit branch comprises resistive means for coupling said first unidirectional conductive device from said high voltage terminal on said horizontal output transformer to said output charge storage device.

4. A circuit as defined in claim 3 wherein said lower voltage output means further comprises:
   a voltage-dividing network coupled in parallel relationship to said output charge storage device, said network including means for varying the voltage supplied therefrom.

5. A circuit as defined in claim 1 wherein said lower output voltage means comprises a focus voltage supply in a television receiver.

6. In a television receiver electron beam deflection circuit, a power supply comprising:
   a horizontal deflection output transformer;
   a high voltage winding on said horizontal output transformer;
   means for producing an electron-beam-accelerating voltage, said means including first, second, third, fourth, fifth, sixth and seventh unidirectional conductive devices serially coupled from a high voltage terminal on said high voltage winding of said horizontal output transformer to an output terminal, said unidirectional conductive devices being poled to conduct in the same direction;
   said means for producing electron-beam-accelerating voltage further including a first charge storage device coupled from said high voltage terminal to a junction of said second and third unidirectional conductive devices, a third charge storage device coupled from said junction of said second and third unidirectional conductive devices, to a junction of said fourth and fifth unidirectional conductive devices, a fifth charge storage device coupled from said junction of said fourth and fifth unidirectional conductive devices to the junction of said sixth and seventh unidirectional conductive devices, said first, third and fifth charge storage devices being coupled in series relation;

a second charge storage device coupled from a junction of said second unidirectional conductive device and a series combination of a resistance and said first unidirectional conductive device to a junction of said third and fourth unidirectional conductive devices, a fourth charge storage device coupled from said junction of said third and fourth unidirectional conductive devices to the junction of said fifth and sixth unidirectional conductive devices and a final charge storage device coupled from said junction of said fifth and sixth unidirectional conductive devices to said output terminal; and means for producing a lower output voltage responsive to the magnitude of electron beam current to track said beam accelerating voltage at a predetermined relationship, said means including an output charge storage device coupled to the series combination of said resistance and said first unidirectional conductive device;

said output charge storage device further being coupled, remote from said series combination, to a reference potential; and said means for producing a lower output voltage further including a voltage dividing network coupled in parallel relationship to said output charge storage device, said network including means for varying the voltage extracted therefrom.

7. A circuit as defined in claim 6 and further comprising:

resistive means coupled from a junction of said seventh unidirectional conductive device and said sixth charge storage device to an ultor output terminal for limiting current supplied at said ultor output terminal.

8. A circuit as defined in claim 6 wherein said lower output voltage means comprises a focus voltage in a television receiver.